2,786,069

CHELATES OF HYDROXY INDANONES

Donald G. Kundiger, Manhattan, Kans., and Donald D. Wheeler, Midland, Mich., assignors to The Dow Chemical Company, Midland, Mich., a corporation of Delaware No Drawing. Application June 2, 1955,
Serial No. 512,862

6 Claims. (Cl. 260—429.9)

This invention is directed to novel copper and zinc chelates of substituted-7-hydroxy-2-methyl-1-indanones. The compounds of the invention have the formula

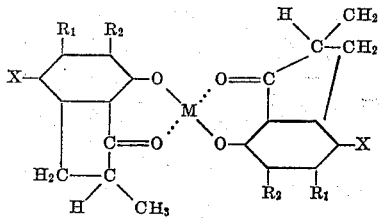

wherein M represents copper or zinc, X is chlorine, bromine or an alkyl radical containing from 1 to 3 carbon atoms, inclusive, $R_1$ represents hydrogen, chlorine or an alkyl radical containing from 1 to 3 carbon atoms, inclusive, and $R_2$ is hydrogen or an alkyl radical containing from 1 to 3 carbon atoms, inclusive. These compounds are crystalline solids having relatively low solubility in water and in most organic solvents.

The new compounds of the invention have been found useful as toxic agents for the control of fungi. Further, they have proved useful as intermediates for the purification of the corresponding 7-hydroxy-2-methyl-1-indanones.

In one method of preparation of the new compounds, two molecular proportions of a substituted-7-hydroxy-2-methyl-1-indanone having the formula

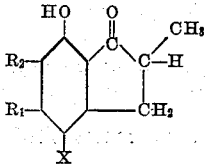

are reacted with one molecular proportion of a suitable copper or zinc salt in a reaction solvent. In the above formula, X, $R_1$ and $R_2$ have the significance set forth above. In such operations it is generally preferred to employ a slight excess of the copper or zinc salt to insure completion of the reaction to form the desired chelate of the substituted-7-hydroxy-2-methyl-1-indanone.

The copper or zinc salts ordinarily are employed in the reaction in the form of an aqueous or alcoholic solution. Any suitable copper or zinc salt may be employed provided it is characterized by sufficient solubility in water or alcohol to be readily introduced into the reaction mixture. Thus, for example, good results are obtained when employing the chloride, acetate or nitrate of zinc or of cupric copper to provide the metallic ion for forming the chelate compound. Also, the zinc or cupric salt advantageously is employed in an amount slightly in excess of theoretical.

Suitable reaction solvents are those having the properties of readily dissolving the substituted-7-hydroxy-2-methyl-1-indanone starting material and of being miscible with the solution of copper or zinc salt employed. In general, it is preferred to dissolve the substituted indanone in a lower aliphatic alcohol such as methanol, ethanol or propanol and to mix the resulting solution with the aqueous or alcoholic solution of the copper or zinc salt.

In a preferred method of operation, a substituted-7-hydroxy-2-methyl-1-indanone as set forth above is dissolved in an excess of ethanol at a temperature of from 50° to 75° C. and a hot aqueous solution of the copper or zinc salt is added to the indanone solution to precipitate the desired chelate compound as a crystalline solid. The latter is separated by filtration, successively washed with water, alcohol and acetone and dried at room temperature.

The substituted-7-hydroxy-2-methyl-1-indanones may be prepared by the rearrangement and internal condensation of certain substituted-phenyl alpha-chloroisobutyrates in the presence of anhydrous aluminum chloride. In such operations one mole of a chloroisobutyrate of the formula

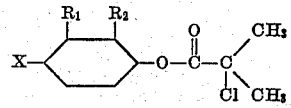

wherein X, $R_1$, and $R_2$ are defined as above, is mixed with at least about 2 moles of finely divided anhydrous aluminum chloride at a temperature of from about 50° to 65° C. and the resulting mixture thereafter heated to a reaction temperature of from about 55° to 70° C. The reaction mixture is then maintained at gradually increasing temperatures up to not more than about 105° C. for several hours to complete the reaction. On completion of the reaction, aluminum chloride and organic aluminum complexes are decomposed with a mixture of ice and strong mineral acid and the desired indanone product separated by conventional methods such as extraction and fractional distillation. The above method for preparing the indanone compounds is disclosed and claimed in an application, Serial No. 512,861, filed concurrently herewith.

The following examples illustrate the invention but are not to be construed as limiting:

Example 1

50 grams of 4-chloro-7-hydroxy-2-methyl-1-indanone (melting at 39°–40° C.) was dissolved in 1000 milliliters of warm ethanol and a solution of 25 grams of cupric acetate monohydrate in 550 milliliters of hot water added thereto with stirring. The mixing of the solutions resulted in the precipitation of a green solid. The reaction mixture was cooled to room temperature and filtered to separate the solid precipitate. The latter was washed successively with ethanol, water and acetone and air-dried to obtain the desired copper chelate of 4-chloro-7-hydroxy-2-methyl-1-indanone as a green crystalline solid melting at 221°–222.5° C. with decomposition.

Example 2

28.5 grams of zinc acetate dihydrate was dissolved in 200 milliliters of hot water and the resulting solution mixed with a solution of 50 grams of 4-chloro-7-hydroxy-2-methyl-1-indanone in 300 milliliters of ethanol. The mixing of the solutions resulted in the precipitation of a yellow solid. The reaction mixture was cooled to about room temperature and filtered to separate the solid precipitate. The latter was washed with ethanol and air-dried to obtain the zinc chelate of 4-chloro-7-hydroxy-2-methyl-1-indanone as a yellow crystalline solid, melting at 280°–285° C. with decomposition.

Example 3

17.1 grams of cupric acetate was dissolved in 300 milliliters of hot water and added with stirring to a solution of 30 grams of 2,4-dimethyl-7-hydroxy-1-indanone (boiling at 78°–83° C. at 0.2 millimeters pressure) in 500 milliliters of hot ethanol. The resulting mixture was cooled to room temperature to precipitate a green solid. The latter was separated by filtration, washed with alcohol and air-dried to obtain the copper chelate of 2,4-dimethyl-7-hydroxy-1-indanone as a green crystalline solid, melting at 131°–134° C.

Example 4

In a similar fashion, 18.7 grams of zinc acetate dissolved in 300 milliliters of water was reacted with 30 grams of 2,4-dimethyl-7-hydroxy-1-indanone and the product separated as in Example 3 to obtain the zinc chelate of 2,4-dimethyl-7-hydroxy-1-indanone as a yellow crystalline solid.

Example 5

264 grams of technical 2,4,5-trimethyl-7-hydroxy-1-indanone was dissolved in 1500 milliliters of hot ethanol and the resulting solution mixed with a solution of 100 grams of cupric acetate monohydrate in 1000 milliliters of hot water. The resulting green precipitate was separated, washed and dried as in Example 1 to obtain the copper chelate of 2,4,5-trimethyl-7-hydroxy-1-indanone as a green crystalline solid, melting at 225.5°–226° C.

Example 6

Following the general procedure of the preceding examples, alcoholic solutions of 2,4,6-trimethyl-7-hydroxy-1-indanone (boiling at 94.5°–95° C. under 0.2 millimeter pressure) and of 4-bromo-7-hydroxy-2-methyl-1-indanone (melting at 49°–51° C.) were mixed with aqueous solutions of cupric acetate in the proportions of 2 moles of substituted indanone to one mole of copper salt, and the precipitates separated, washed and dried to obtain the copper chelate of 2,4,6-trimethyl-7-hydroxy-1-indanone, melting at 236.5°–237° C. with decomposition and the copper chelate of 4-bromo-7-hydroxy-2-methyl-1-indanone, melting at 224°–224.5° C. with decomposition, respectively. In a similar manner, alcoholic solutions of 4-ethyl-7-hydroxy-2-methyl-1-indanone and of 4-isopropyl-7-hydroxy-2-methyl-1-indanone are mixed with aqueous solutions of cupric chloride and the resulting precipitates separated, washed and dried to obtain the copper chelate of 4-ethyl-7-hydroxy-2-methyl-1-indanone and the copper chelate of 4-isopropyl-7-hydroxy-2-methyl-1-indanone, respectively, as green crystalline solids.

Example 7

25 parts by weight of the copper chelate of 4-chloro-7-hydroxy-2-methyl-1-indanone was mixed with 2 parts of wetting and dispersing agents and 73 parts of a finely ground attapulgite clay to produce a wettable powder. The latter was dispersed in water to produce an aqueous spray composition containing 3 pounds of the chelate compound per 100 gallons of water. The resulting spray composition was applied to wet thoroughly the foliage of a group of young tomato plants of a blight-susceptible variety. After drying, the plants were inoculated with a suspension of viable spores of tomato early blight (*Alternaria solani*) and maintained under conditions of temperature and humidity conducive to the growth of the blight organism. Good commercial control of blight organism was obtained on the sprayed plants. On a similar group of tomato plants, inoculated in like manner, without previous spraying and maintained under the same conditions, a heavy infestation of early blight lesions was observed.

We claim:

1. Copper and zinc chelates of substituted-7-hydroxy-2-methyl-1-indanones having the formula

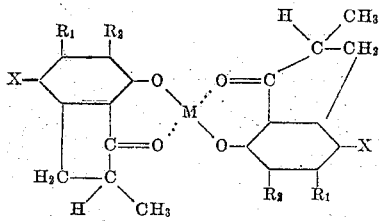

wherein X is selected from the group consisting of chlorine, bromine and alkyl radicals containing from 1 to 3 carbon atoms, inclusive, $R_1$ represents a member of the group consisting of hydrogen, chlorine and alkyl radicals containing from 1 to 3 carbon atoms, inclusive, $R_2$ represents a member of the group consisting of hydrogen and alkyl radicals containing from 1 to 3 carbon atoms, inclusive, and M is selected from the group consisting of copper and zinc.

2. The copper chelate of 4-chloro-7-hydroxy-2-methyl-1-indanone.

3. The zinc chelate of 4-chloro-7-hydroxy-2-methyl-1-indanone.

4. The copper chelate of 2,4-dimethyl-7-hydroxy-1-indanone.

5. The copper chelate of 2,4,5-trimethyl-7-hydroxy-1-indanone.

6. The copper chelate of 2,4,6-trimethyl-7-hydroxy-1-indanone.

No references cited.